Oct. 13, 1964    O. A. WANDEL ETAL    3,152,335
FASTENER DRIVING DEVICE
Filed June 15, 1962    2 Sheets-Sheet 1
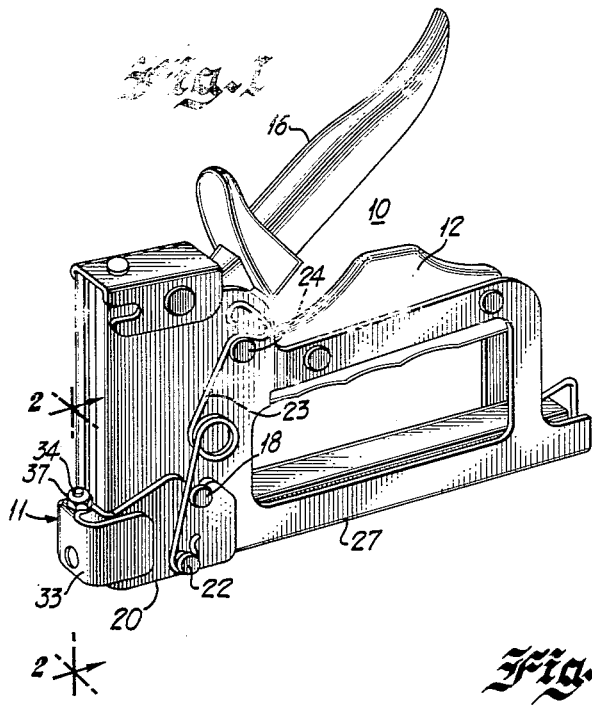
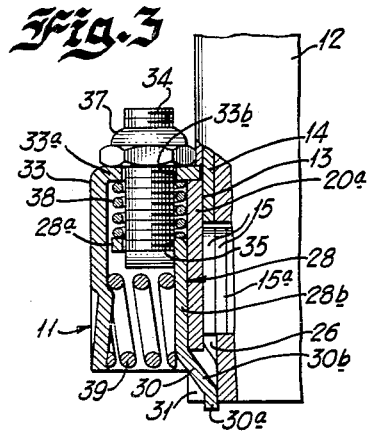
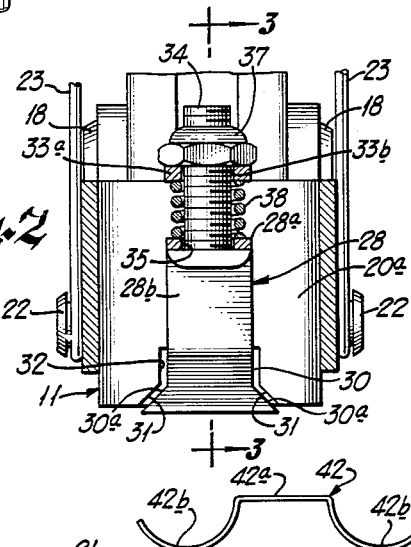
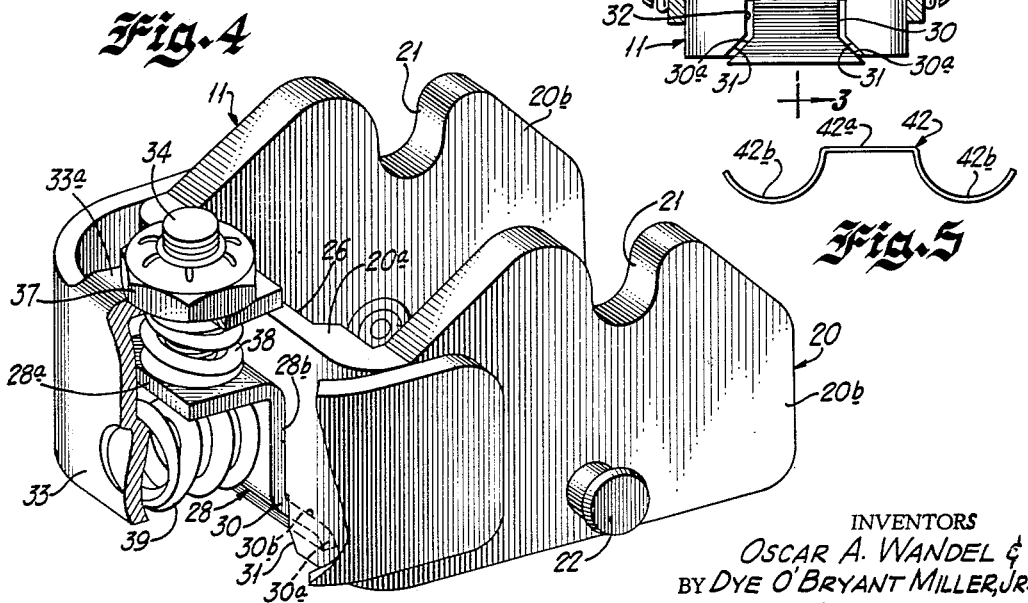
INVENTORS
OSCAR A. WANDEL &
BY DYE O'BRYANT MILLER, JR.
Mason, Kolehmainen, Rathburn and Wyss
ATTORNEYS.

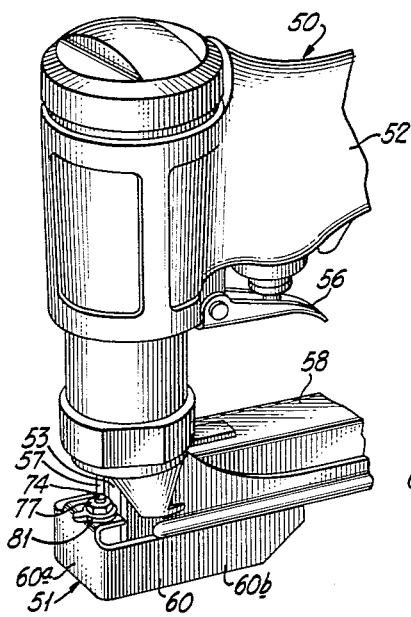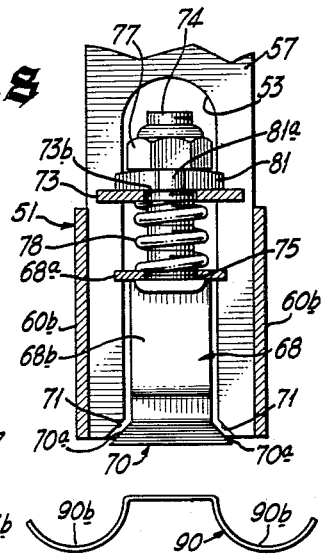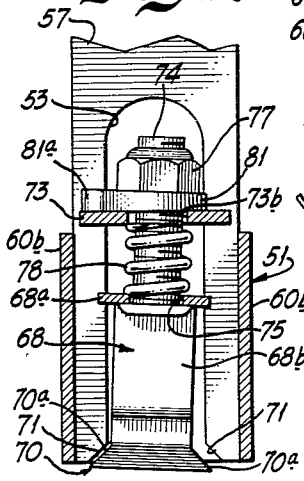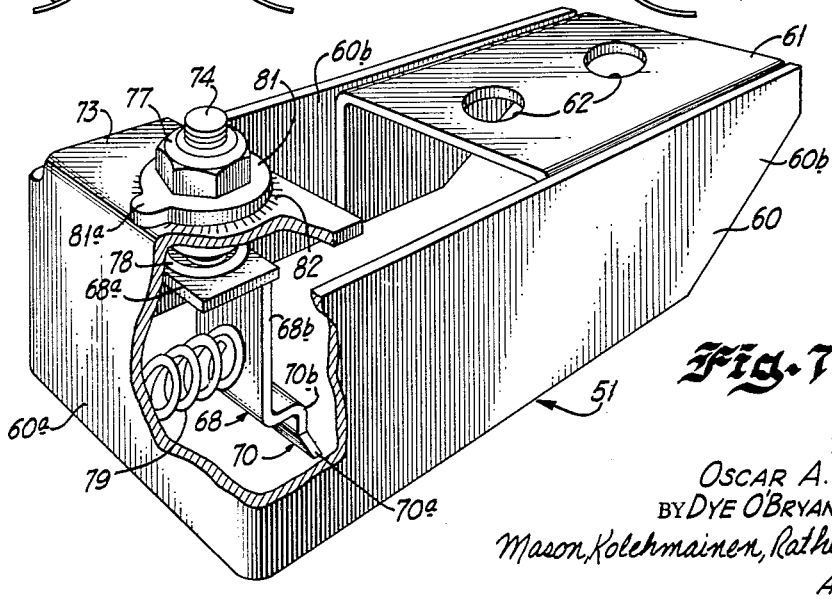

United States Patent Office 3,152,335
Patented Oct. 13, 1964

3,152,335
FASTENER DRIVING DEVICE
Oscar A. Wandel, Mundelein, and Dye O'Bryant Miller, Jr., Norridge Park, Ill., assignors to Fastener Corporation, Franklin Park, Ill., a corporation of Illinois
Filed June 15, 1962, Ser. No. 202,907
3 Claims. (Cl. 1—210)

The present invention relates to a fastener driving device, and, more particularly, to an outside clinch attachment for a fastener driving apparatus.

Existing hand and power operated staple driving equipment affords easily manipulated means for driving fasteners into varying types of workpieces at high speeds. In many manufacturing operations, such as the fabrication of pallets and skids, fasteners are driven through a workpiece and into engagement with an anvil or metal plate with the expectation that the outer ends of the fastener will curl in a particular direction and re-enter the workpiece to clinch the fastener. Therefore, the fastener, such as a staple, cannot be satisfactorily clinched unless the legs of the staple can be driven rectilinearly through the workpiece to engage the anvil and then deflected or curled to re-enter the workpiece in a predictable manner.

In other operations in which staples are used, the staple legs are provided with point structures that cause the legs to deflect or curl as they are driven into the workpiece so as to avoid the use of an anvil structure. These point structures consist of one or more inclined surfaces defining an apex which does not fall on the center line or axis of the leg. The points, which are identified as divergent points, divergent chisel points, or inside double points, engage the fibers of a wooden workpiece, for example, to cause the staple legs to deflect from straight line movement and curl within the workpiece.

In many applications where it is desirable to clinch the fastener, it is impractical or impossible to provide a back-up anvil beneath or behind the work to cause the desired deflection and curling of the staple. Moreover, in certain types of material, the fibers or composition of the material are ineffective to cause the desired curl of the fastener. As an example in the stapling of a paperboard carton from the outside where it is desired to obtain a curling or clinching of the staple on the inside of the carton, it is impossible to provide a backup anvil, and the paperboard material does not curl or deflect the legs of the fastener.

Accordingly, one object of the present invention is to provide a new and improved fastener driving device.

A further object of the present invention is to provide an improved fastener driving device which is effective to produce a clinching or curling of the staple.

A further object of the present invention is to provide an improved fastener driving device having a self-contained, self-aligning, adjustable anvil for providing the desired clinching of the staple.

A further object of the present invention is to provide an improved outside clinch attachment suitable for use with a staple driving apparatus.

Further objects and advantages of the present invention will become apparent as the following description proceeds and the features of novelty which characterize the invention will be pointed out with particularity in the claims annexed to and forming a part of this specification.

In accordance with these and many other objects, there is provided an improved outside clinch attachment for a staple driving apparatus of the type having a driver blade reciprocably operable in a drive track during driving and return strokes thereof for engaging and driving staples supplied to the drive track from an elongated strip of staples in a magazine assembly. The outside clinch attachment is applicable to manually-operated and power-operated devices. As an example, the outside clinch attachment can be applied to a hand stapler similar to that disclosed in Wandel Patent No. 2,593,231 or to the pneumatically operated stapler disclosed in the copending application of Oscar A. Wandel, Serial No. 832,800, filed August 10, 1959, which application is assigned to the same assignee as the present invention.

The outside clinch attachment comprises a frame secured to the staple driving apparatus and including a drive track aligned with the drive track of the staple driving apparatus. An anvil member pivotally supported on the frame includes a clinching portion having outwardly and downwardly edge portions that are resiliently biased into the drive track. When a staple is driven, the lower ends of the staple legs engage the inclined edge portions of the anvil and are displaced outwardly thereby. The outwardly spreading legs of the staple pass through the workpiece and curl outwardly below the workpiece. Toward the end of the driving stroke, the crown of the staple or the driver blade engages the anvil and moves it against the resilient bias to a position displaced out of the drive track. This permits the passage of the staple and the driver blade past the clinching portion of the anvil so that the staple can be completely driven into the workpiece.

In accordance with another feature of the invention, the frame can be provided with complementary beveled side portions at the lower end of the drive track so that the legs of the staple are driven between the clinching portion of the anvil and the lower beveled portion of the drive track. The amount of curl produced in the staple legs can be controlled by the position of the anvil relative to the beveled portions of the drive track. A beveled or eccentric washer is disposed between the anvil and the frame, and can be adjusted to different positions to correct any irregular curl of the legs of the staple that may result from anvil wear or other irregularities in the assembly of the clinching device.

Many other objects and advantages of the present invention will become apparent from a consideration of the following detailed description in conjunction with the following drawings, in which:

FIG. 1 is an isometric view of a hand stapler provided with an outside clinching attachment embodying the present invention;

FIG. 2 is an enlarged sectional view of the clinching attachment taken along line 2—2 in FIG. 1;

FIG. 3 is a sectional view taken along line 3—3 in FIG. 2;

FIG. 4 is a fragmentary isometric view of the outside clinch attachment;

FIG. 5 is an elevational view of a typical staple that has been clinched by the outside clinching attachment shown in FIGS. 1–4;

FIG. 6 is a fragmentary isometric view of a pneumatically operated stapler provided with a modified outside clinch attachment embodying the present invention;

FIG. 7 is a fragmentary isometric view of the outside clinch attachment shown in FIG. 6;

FIG. 8 is a front elevational view of the outside clinch attachment shown in FIG. 6 with portions thereof broken away;

FIG. 9 is a front elevational view of a typical staple clinched by the outside clinch attachment shown in FIGS. 6–8;

FIG. 10 is a front elevational view similar to FIG. 8 illustrating a misalignment between an anvil and a frame included in the clinching attachment;

FIG. 11 is an elevational view of a staple driven with the clinching attachment in the position illustrated in FIG. 10; and FIG. 12 is an elevational view of a staple driven with the outside clinch attachment of FIGS. 6–8 adjusted to impart a different amount of curl to the legs of the staple.

Referring now to FIGS. 1–5 of the drawings, therein is illustrated a hand-operated stapler or fastener driving apparatus 10 (FIG. 1) provided with an outside clinch attachment 11 embodying the present invention. The stapler 10 can be of any of the well-known constructions, such as the one illustrated in the above-referenced patent. In general, the stapler 10 comprises a body or housing 12 having a forward vertical fastener guideway or drive track 13 (FIG. 3). A reciprocal driving blade 14 is operable in the drive track 13 to drive staples 15 supplied from an elongated stick or strip 15a of staples in a magazine asembly 27. As is well known, a typical staple 15 is formed with a crown portion interconnecting a pair of downwardly extending spaced legs. The driving blade 14 is driven during a driving stroke by a compression spring (not shown) which is compressed and released by an operating lever or handle 16 pivotally mounted on the stapler 10. Moreover, the housing 12 of the stapler 10 is provided with a pair of aligned pins or studs 18 (FIGS. 1 and 2), which provide means for securing the clinching attachment 11 to the housing 12 of the stapler 10.

The clinching attachment 11 includes a U-shaped adapter or attachment frame 20 (FIG. 4) having a bight portion 20a interconnects a pair of spaced leg portions 20b. The leg portions 20b are provided with recesses or grooves 21 in their upper edges which are adapted to engage the pins 18 to position the clinching attachment 11 on the stapler 10. Moreover, the attachment frame 20 is provided with a pair of spaced and aligned pins 22 which cooperate with a pair of spring means 23 and a pair of pins 24 secured to the housing 12 to detachably mount the attachment 11 on the housing 12. The clinch attachment 11 is placed against the lower front wall of the housing 12 with the pins 18 disposed in the recesses 21. The torsion springs 23 are then hooked between the pins 22 on the attachment frame 20 and the pins 24 on the housing 12 to detachably hold the attachment 11 in place.

To provide for the continuation of the drive track 13 through the clinch attachment 11, the bight portion 20a (FIGS. 3 and 4) of the attachment frame 20 is provided with a vertically extending recess 26 aligned with the portion of the drive track 13 formed in the housing 12 of the stapler 10 (FIG. 3). The rear surface of the recessed bight portion 20a defines the front wall of the lower end of the drive track 13. The magazine assembly 27 feeds the staples 15 into the track 13 from the side opposite to the bight portion 20a and immediately below the lower end of the driver blade 14 (FIG. 3).

For forming an outward curl in the legs of the staples 15 as they are driven into the workpiece, there is provided a self-aligning, adjustable L-shaped anvil 28 having a short leg 28a and a long leg 28b with a clinching portion 30. The clinching portion 30 is offset inwardly through a lower opening 32 (FIG. 2) in the bight portion 20a to be disposed in the lower end of the drive track 13. The portion 30 includes a pair of downwardly and outwardly inclined edges or side portions 30a that are each positioned opposite and spaced from a pair of inwardly and upwardly inclined edges 31 (FIG. 2). The edges 31 are formed in the lower portions of the bight 20a at the lower end of the recess 26. When a staple 15 is driven through the drive track 13, the legs thereof are brought into engagement with the clinching portion 30 of the anvil 28 and pass between the inclined side portions 30a of the anvil 28 and the inclined edges 31 to impart the desired curl to the legs of the staples to outwardly clinch the staples (see FIG. 5).

In order to pivotally support and position the anvil 28 with the clinching portion 30 thereof projecting into the drive track 13, there is provided a generally U-shaped anvil supporting frame or housing 33 that is secured to the front of the attachment frame 20 by welding or other suitable means. The anvil support 33 is provided with an upper inwardly extending horizontal projection or anvil support 33a provided with an aperture or opening 33b for receiving a T-head screw 34. The T-head screw 34 extends through an opening 35 in the short arm 28a of the anvil 28 and the opening 33b in the anvil support housing 33. An elastic stop nut 37 threaded on the screw 34 adjustably positions the anvil 28 relative to the projection 33a and, accordingly, provides a selected spacing between the beveled side portions 30a and the inclined edges 31 of the drive track 13. An anvil adjustment compression spring 38 is interposed between the projection 33a of the anvil support housing 33 and the short arm 28a of the anvil 28 to provide a biasing force on the anvil 28.

An inner upper surface 30b (FIG. 3) of the clinching portion 30 is inclined rearwardly and downwardly in the drive track 13 to provide a cam surface for shifting the anvil 28 out of the drive track 13. When the blade 14 moves downwardly, the crown of the staple 15 being driven and the driving blade 14, engage the surface 30b to pivotally deflect the anvil 28 about the head of the T-head screw 34 in a clockwise direction to move the clinching portion 30 thereof out of the drive track 13. This permits the crown of the staple 15 and the driving blade 14 to pass by the anvil and permits the staple 15 to be driven flush with the workpiece. An anvil pressure or compression spring 39 positioned between the bight portion of the anvil support housing 33 and the long leg 28b of the anvil 28 biases the clinching portion 30 of the anvil 28 into the drive track 13. The spring 39 also cooperates with the anvil adjustment spring 38 to permit the pivoting movement of the anvil 28 out of the drive track 13.

FIG. 5 illustrates a typical staple, identified as 42, driven and clinched by the stapler 10. The clinched staple 42 includes a crown portion 42a and outwardly curled leg portions 42b. The amount of curl to the leg portions 42b is readily selected by adjusting the nut 37. When the nut 37 is tightened, the anvil 28 is moved closer to the inclined edges 31 to impart more curl to the leg portions 42b. Loosening of the elastic nut 37 permits the spring 38 to move the anvil 28 away from the edges 31, and the amount of the curl in the clinched staple 42 is reduced.

Referring now to the embodiment shown in FIGS. 6–12, there is illustrated a pneumatically operated stapler or fastener driving apparatus 50 provided with an outside clinch attachment 51 embodying the present invention. Pneumatically operated staplers of this type are well known, and one typical pneumatically operated stapler is illustrated in the above-identified copending application. Briefly, the pneumatic staple driving apparatus 50 can include a housing 52 carrying a cylinder in which a piston secured to the upper end of a fastener driving blade is slidably mounted. When compressed air is admitted into the interior of the cylinder under the control of a trigger actuated control valve 56, the piston moves downwardly to advance the driving blade through a drive track 53 formed in a nosepiece 57 of the stapler 50. During this downward movement, the end of the driving blade engages the crown portion of a staple and drives it out of the bottom of the drive track 53 into the workpiece. When the trigger controlled valve 56 is released, means are provided for resiliently returning the piston to retract the driver blade out of the drive track 53 so that a magazine assembly 58 supplies another staple to the drive track 53.

Referring now to the clinch attachment 51 (FIG. 7), the clinch attachment 51 includes a generally U-shaped adapter or attachment frame 60 provided with a bight portion 60a interconnecting a pair of spaced leg portions 60b. A U-shaped bracket 61 extends transversely between the spaced legs 60b of the attachment frame 60 and is secured thereto by welding or other suitable means. The bracket 61 is provided with suitable apertures 62 through which suitable bolts (not shown) extend to secure the attachment frame 60 to the bottom wall of the magazine assembly 58. In this manner, the attachment frame 60 is securely held in place on the stapler 50 and can readily be removed from the stapler 50 if it becomes necessary to free a jammed staple.

For providing an outward curl to the legs of the staples as they are driven through the drive track 53 into a workpiece, there is provided an adjustable L-shaped anvil 68 having a short arm 68a and a long arm 68b provided with a clinching portion 70. The clinching portion 70 includes a pair of outwardly beveled or inclined side portions or edges 70a and is bent inwardly so that the side portions 70a are disposed within the drive track 53. The lower end of the nosepiece structure is provided with two spaced outwardly beveled or chamfered side portions 71 (FIGS. 8 and 10) that are disposed immediately opposite the inclined edges 70a. When a staple is driven through the drive track 53, the legs thereof are brought into engagement with the clinching portion 70 of the anvil 68 and pass between the beveled side portions 70a of the anvil 68 and the chamfered portions 71 formed in the nosepiece 51 to impart the desired curl to the staple legs to clinch the staple.

In order to pivotally support and position the anvil 68 with the clinching portion 70 thereof projecting into the drive track 53, there is provided an anvil support or frame portion 73 extending horizontally inward along the upper forward edge of the attachment frame 60. The anvil support 73 is provided with an aperture or opening 73b for supporting a T-head screw 74. The T-head screw 74 extends through an opening 75 in the short arm 68a of the anvil 68 and the opening 73b in the anvil support housing 73. An elastic stop nut 77 threaded on the screw 74 adjustably positions the anvil 68 relative to the anvil support 73 and, accordingly, provides a selected spacing between the beveled side portions 70a and the chamfered portions 71. An anvil adjustment compression spring 78 is interposed between the anvil support 73 and the short arm 68a of the anvil 68 to provide a biasing force on the anvil 68.

An inner upper surface 70b (FIG. 7) of the clinching portion 70 is inclined rearwardly and downwardly in the drive track 53 to provide a cam surface engaged by the crown of a staple and by the driving blade of the stapler to pivotally deflect the anvil 68 about the head of the T-head screw 74 and move the clinching portion 60 thereof out of the drive track 53 to permit the crown of the staple and the driving blade to pass through the drive track 53. Moreover, an anvil pressure or compression spring 79 is positioned between the bight portion of the adapter frame 60 and the long leg 68b of the anvil 68 positively to bias the clinching portion 70 of the anvil 68 into the drive track 53 and cooperates with the anvil adjustment spring 78 to permit pivoting of the anvil 68 out of the drive track 53 to provide for passage of the staple and driver blade past the clinching portion 70 of the anvil.

To compensate for irregular curl of the legs of the staple, which may result from anvil wear or other irregularities in the assembly of the clinch attachment 61, a wedge-shaped or beveled washer 81 is interposed between the nut 77 and the support 73 to provide means for adjustably aligning the position of the anvil 68 relative to the nosepiece 57. FIGURE 10 of the drawings illustrates the anvil 68 in a skewed or misaligned position relative to the drive track 53 and the nosepiece 57, and FIG. 11 illustrates an asymmetrically clinched staple 92 produced by the structure shown in FIG. 10 in which one leg 92b has been curled to a greater degree than the other leg 92c. FIG. 9 illustrates a properly clinched staple 90 in which the two legs 90b are equally curled.

In order to correct the asymmetry of the staple 92, the eccentric washer 81 is adjusted or rotated about the axis of the bolt 74 to bear against the nut 77 and the support 73 in such a manner that the anvil is correctly centered relative to the nosepiece 57, as illustrated in FIG. 8. The spring bias provided by the spring 78 permits the adjustment to be made without loosening the nut 77. To facilitate the angular setting of the washer 81, this washer is provided with an index projection 81a (FIG. 7), and the support 73 is provided with a series of grooves forming an index scale 82. The washer 81 can also be used to cause an asymmetrical clinching of the staples in any application in which this is desired, and the degree of asymmetry can be selected by adjusting the index 81a relative to the scale 82.

FIG. 12 illustrates a staple 94 clinched with considerably less curl in its legs than the staples 90 and 92. The staple 94 includes a crown portion 94a and a pair of symmetrically curled legs 94b. However, the curl in the legs 94b is considerably less than the curl in the legs 90b of the staple 90. The degree of curling imparted to the legs of the staples can be selected by adjusting the nut 77. When the nut 77 is tightened to move the portion 70a closer to the portion 71, a greater degree of curling is applied to the staple legs. Loosening of the nut 77 permits the spring 78 to lower the anvil 68 so that the staple legs are curled to a lesser degree.

From the preceding description, the operation of the clinch attachments is believed clear. When the staple is driven downwardly through the drive track, the legs of the staple strike the outwardly inclined side projections of the clinching portion of the anvil to produce an outward curl to the staple legs as they pass into the workpiece. The anvil is provided with a cam surface which is engaged by the driver blade or staple casing to deflect the anvil to permit the passage of the staple and driving blade past the anvil. The anvil adjustment means permit the selection of the amount of curl imparted to the legs of the staple, and the adjustable eccentric mounting for the anvil provides means for alignment or misaligning the relative positions of the anvil and the drive track to provide symmetrical or asymmetrical clinch of the staples.

Although the present invention has been described by reference to preferred embodiments thereof, it will be apparent that numerous other modifications and embodiments will be devised by those skilled in the art which will fall within the true spirit and scope of the present invention.

What is claimed as new and is desired to be secured by Letters Patent of the United States is:

1. An outside clinch attachment for a staple driving apparatus of the type having driving means operable in a drive track to drive staples into a workpiece, said attachment comprising frame means adapted to be secured to a staple driving apparatus and including an anvil support, said drive track terminating in outwardly chamfered side portions, an L-shaped anvil member having one leg terminating in a clinching portion formed with a pair of outwardly beveled side portions complementary to and spaced from the first-mentioned side portions and projectable into said drive track, bolt means pivotally interconnecting said anvil support and the other leg of said anvil in spaced relation, spring biasing means positioned between said anvil support and the other of said legs, additional spring biasing means positioned between said one of said legs and a portion of said frame means biasing said anvil to project said clinching portion into said drive track, said anvil including a cam surface which projects inwardly and downwardly into said drive track when the clinching portion is projected into the drive track by said additional spring means, and means for aligning said anvil relative to the drive track, said means for aligning the anvil including a beveled washer interposed between said bolt means and said one of said legs.

2. An outside clinch attachment for a staple driving apparatus of the type having driving means operable in a drive track to drive staples into a workpiece, said attachment comprising frame means adapted to be secured to a staple driving apparatus and including an anvil support, said drive track terminating in outwardly tapered first side portions, an anvil member having a leg terminating in a clinching portion formed with a pair of outwardly beveled second side portions complementary to and spaced from the first side portions and projectable into said drive track, means pivotally interconnecting the anvil support and the anvil, spring biasing means positioned between the leg of the anvil and a portion of said frame means to bias the clinching portion into the drive track, and means for adjusting said second side portions relative to the first side portions in a direction transverse to the direction of movement of the driving means and in the plane of the drive track.

3. An apparatus for driving staples of the type including a housing having both a structure forming a staple receiving drive track and a fastener driving element slidable in the drive track, frame means mounted on the housing, an anvil member pivotally supported on the frame means and including a clinching portion having outwardly tapered side portions projecting into the drive track, said outwardly tapered side portions cooperating with the spaced side walls of the drive track to impart curl to the legs of a staple driven through said track by the driving element, and means for adjusting the position of the anvil in a direction transverse to and in the plane of movement of the fastener driving element to produce corresponding adjustments in the spacing between the side walls of the drive track and the outwardly tapered side portions of the anvil so as to control the degree of curl imparted to the legs of the staple.

References Cited in the file of this patent
UNITED STATES PATENTS 2,380,655 Lang _____ July 31, 1945
2,420,258 Maynard _____ May 6, 1947